Nov. 15, 1938.  E. BLETZ  2,137,073
THERMOSTATIC CONTROL SYSTEM
Filed March 12, 1936
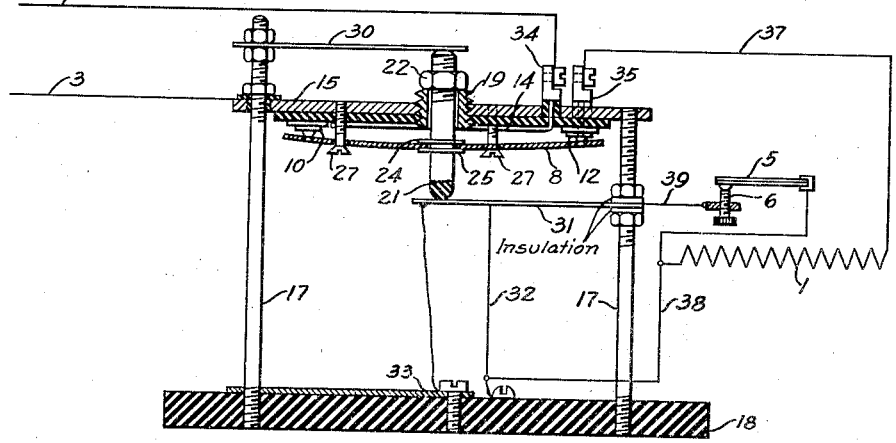
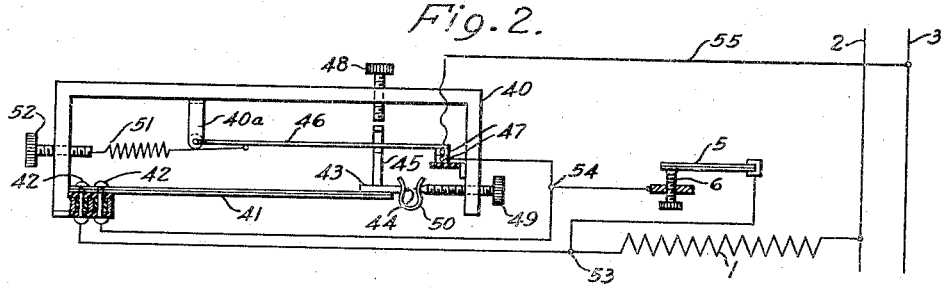
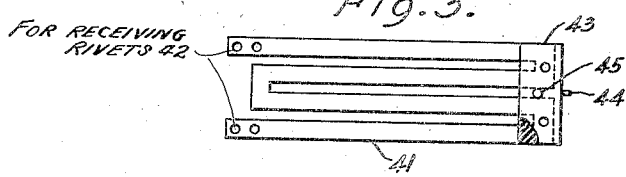
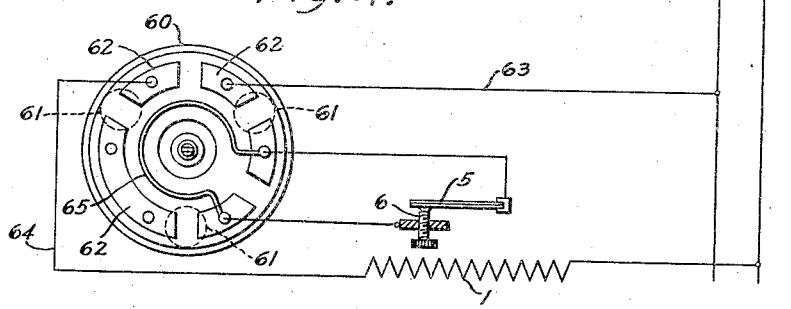
WITNESSES:
Michael Stark
INVENTOR
Edward Bletz.
BY
ATTORNEY Patented Nov. 15, 1938

2,137,073

UNITED STATES PATENT OFFICE 2,137,073

THERMOSTATIC CONTROL SYSTEM

Edward Bletz, Lexington, Ohio, assignor to Westinghouse Electric & Manufacturing Company, East Pittsburgh, Pa., a corporation of Pennsylvania Application March 12, 1936, Serial No. 68,421

3 Claims. (Cl. 219—20)

This invention relates to heating appliances such as ovens, water heaters, flat-irons and the like. More particularly, this invention relates to a means for controlling the supply of heating current for such devices.

It is an object of this invention to provide means for interrupting the heating current when the appliance is at nearly the required temperature and for intermittently supplying heating current thereto afterwards.

It is a further object of this invention to cause the interruptions to occur quickly, thereby minimizing the arcing.

It is a further object of this invention to so control the reestablishment of the heating circuit that, if the energy supplied to the appliance is in excess of that necessary to keep it at the desired temperature, the interruption will be of long duration but if the energy supplied is barely sufficient to bring the appliance to the desired temperature, the interruptions will be of shorter duration and will occur less frequently.

Other objects of this invention and details of the proposed apparatus will be clear from the following description and the accompanying drawing, in which Figure 1 is a diagrammatic showing of one form of my invention, Fig. 2 is a similar diagram illustrating a different form, Fig. 3 is a plan view partly in section of a bimetallic element forming a part of Fig. 2, and Fig. 4 is a diagram illustrating another form of the invention.

As shown in Fig. 1, the heater 1 may be a part of any heating appliance. It may well be the heating coil of an oven or a water heater but any other appliance employing heat could be supplied with heat from the coil 1. The heating current is supplied by the mains 2 and 3 and is controlled by a thermally responsive circuit controller comprising a bimetallic strip 5 upon which is mounted one of a pair of contacts 6.

A disk 8, preferably of the same shape as the familiar bimetallic thermostat disk, but consisting only of a single metal, is provided and, in the position illustrated, closes the circuit by holding the bridging contacts 10 and 12 where they bridge openings in the annular conductor 14. One opening thus bridged is sufficient but as many openings as desired may be provided. The annular conductor 14 is shown as mounted on but insulated from the under side of a metallic table 15 supported upon metallic posts 17 extending from a base 18.

At the center of the table 15 an orifice is provided which is lined by means of a threaded bushing 19. Through the bushing 19 a plunger 21 extends. A nut 22 is threaded upon the upper end of this plunger and by being adjusted along it serves to position the plunger. A pair of flanges or collars 24 and 25, one of which is permanently secured to the plunger and the other of which is adjustable thereon grasp the disk 8 between them. A hole in the central part of the disk provides for the plunger 21.

Screws 27 are mounted in the table 15 and serve to secure the disk 8 against removal therefrom and to snap the disk when the plunger moves downward, as hereinafter more fully described. Preferably there are three of these screws although only two have been shown in the drawing.

One of the posts 17 extends above the table and has adjustably mounted thereon a flat spring 30 which bears upon the upper end of the post 21. The other post 17 has adjustably secured to it below the table 15 a flat spring 31 which contacts with the lower end of the plunger 21. The spring 31 is restrained from pressing against the lower end of the post 21 by a wire 32, the lower end of which is secured by a plate 33 to the base 18. When the wire 32 is heated, it expands and permits the spring 31 to push the post 21 upward, displacing the spring 30.

The main or supply wire 2 extends to a terminal post 34 which insulatedly extends through the table 15 and may be integral with one portion of the annular conductor 14. A terminal post 35 also insulatedly extends through the table 15 and may be integral with another portion of the annular conductor 14. The gap separating these portions is bridged by the bridging piece 10 or 12. From the terminal post 35, the circuit extends through a wire 37 to the heater 1 and from the heater 1 it extends over a wire 38 to the wire 32. The circuit also extends in parallel with the wire 32, through the bimetallic member 5, contacts 6 and a wire 39, to the spring 31, (which is insulatedly supported by one of the posts 17) and so to the upper end of the wire 32. From the junction of wires 32 and 38 the circuit extends through wire 32 and spring 31 to plate 33, and post 17 to the main wire 3. The terminal posts 34 and 35 are insulated from the table 15 in any usual way, not shown.

In the operation of my device, in the form shown in Fig. 1, when the heating current is turned on, the heater 1 heats the appliance and incidentally heats the bimetallic bar 5. Some current also passes through the wire 32 in parallel with the bimetallic bar 5 and the contacts 6, but this current is too small to cause any substantial change in the length of the wire 32.

When the heater 1 has heated the bimetal 5 enough to cause contacts 6 to separate, all of the current which goes through heater 1 also goes through and heats the wire 32 and the length of this wire increases accordingly. The increase in the length of the wire 32 releases the spring 31 and permits it to press against the end of the post 21. This causes the flange 25 on the post to press the middle of the dome-shaped disk 8 upward.

The bridging pieces 10 and 12 cannot rise further than the illustrated position and they, therefore, resist the upward motion of the disk 8. Consequently, the disk is deformed from the illustrated configuration. When this deformation is sufficient to pass that configuration of the disk in which it is unstable, the disk changes its shape, that is, reverses its curvature, with a snap action. The bridging pieces 10 and 12 thus disengage the conductor 14 and the central portion of the disk 8 moves upward until the upper flange 24 contacts with the lower side of the bushing 19. The movement of the disk 8 under the action of the spring 31 takes place against the force of the spring 30, but after the disk has passed its snap point, the elastic force of the disk is added to the force of the spring 31. The separation of the bridge pieces 10 and 12 from the annular conductor 14 interrupts the heater current and the heat appliance is no longer energized.

The wires 37, 39 and 38 in practice are longer than drawn in the figure and the wire 32 is far enough away from the heater 1 to be influenced by heat therefrom. Moreover, any housing that is provided around the apparatus shown in the left-hand part of Fig. 1 is thin and without any great effect upon the ease with which the wire 32 radiates its heat to the atmosphere. Moreover, the wire 32 is slender and of comparatively small mass. It, therefore, quickly cools to the atmospheric temperature when the current through it has been interrupted by the opening of the circuit at the bridging pieces 10 and 12.

When the wire 32 has become cool, it contracts and draws the spring 31 down, thus enabling the whole of the force of the spring 30 to act on the post 21 and move it downward against the force of the disk 8. With the downward motion of this post, the heads of the screws 27 contact the disk 8 and prevent the outer portions of this disk following the center downward. The strain, thus established in the disk tends to move it toward its illustrated configuration. When the disk passes the unstable configuration, it snaps into the illustrated form and the bridging pieces 10 and 12 contact the annular conductor 14 and again establish the heating circuit. If when this occurs the bimetallic bar 5 is still warm enough for the contacts 6 to be open, the wire 32 is promptly heated and the action is repeated, thus quickly opening the circuit again.

On the other hand, if while the circuit was open the heating appliance has cooled enough to cause contacts 6 to be again closed, the closure of the circuit at the bridging pieces 10 and 12, by the snapping of the disk 8 to the illustrated position, will not immediately result in the heating of the wire 32, but the current will pass mainly through the contacts 6 and only a negligible fraction of it will go through the wire 32. This action will continue until the heater 1 has again heated the bimetal 5 enough to open contacts 6. Then the whole current again traverses the wire 32 and the action first described is again repeated, opening the circuit.

Thus an interruption of the circuit occurs soon after the contacts 6 are opened and continues until the wire 32 has become cool. If the supply of heat from the heater 1 is ample, the appliance will heat up rapidly. The heat supplied to it, after the contacts 6 open, while the device at the left of Fig. 1 is opening its main contacts, will, of course, be larger than it would be if the supply of heat from heater 1 was not so ample. On the other hand, if the heater 1 supplies barely enough heat to bring the appliance to the selected temperature, the heat added to the appliance during the time between the opening of contacts 6 and the opening of contacts 10 and 12 will be small. In the latter case the time taken by the appliance to cool enough to close contacts 6 will be short, but in the former case it will be longer.

If the watts supplied to heater 1 are ample to maintain the heat appliance above the desired temperature, the interruptions will be frequent and the re-establishment of the circuit will be only momentary, but if the watts supplied by the heater 1 are only enough to bring the appliance to the desired temperature by prolonged heating, the interruptions will be brief and when the circuit is re-established it will be continued for a longer time. The interruptions at bridging pieces 10 and 12 occur only after the contacts 6 have been closed and the wire 32 has been heated.

In the form shown in Fig. 2, the heater 1, the main wires 2 and 3, the bimetallic member 5 and the contacts 6 are as already described. In a frame 40, a bimetallic strip 41, best shown in Fig 3 is secured at one end by rivets, as indicated at 42. The rivets are insulated from the frame 40, and, except as connected by the bimetallic strip 41, from each other.

The movable end of the bimetallic member 41 has mounted thereon a plate 43 which may be of insulating material as shown, or may be insulated from member 41. The plate 43 carries a pin 44 which thus moves with the motion of the end of the bimetallic member. If desired, the bimetallic member 41 may be formed, as shown in Fig. 3, of a grid, permitting a considerable length of bimetal to be included in the member. Mounted upon the end plate 43 is a stirrup 45 which embraces a contact lever 46. This lever at one end carries one contact of a pair of contacts 47. The other end of the lever is pivotally mounted in a bracket 40a extending from the frame 40.

An adjusting screw 48 limits the upward movement of the stirrup. A similar screw 49 extending through one arm of the frame 40 has a pointed end adjacent the pin 44. A U-shaped spring 50 presses against the point of the screw 49 and the end of the pin 44. Preferably the spring is secured in place on the pin and the point by means of holes in the end thereof. Attached to the lever 46 near the pivot is a wire which leads to a spring 51, the tension of which may be adjusted by means of a screw 52 mounted in one arm of frame 40.

In the form illustrated in Fig. 2, current from the mains 2 and 3 supplies the heater 1 over a circuit which extends from the main 2 through the heater 1 to junction-point 53 and one terminal 42 of the bimetallic member 41, thence through the member 41 as best seen in Fig. 3, to the other terminal 42 and thence to the junction-point 54. From here, the current goes through the switch terminals 47 and over the line 55 to the main line 3.

There is a shunt to the bimetallic member 41, extending from the point 53 through the bimetallic member 5 and the contacts 6 to the point 54. When current flows in the heater circuit, the heater 1 heats the bimetallic bar 5. Some current also flows through the member 41 but it is small compared with the current traversing the contacts 6. When the bar 5 is heated to a predetermined degree, the contacts 6 open and then the full current traverses the member 41.

The normally small current through the member 41 has little effect on it but when the full current traverses the member 41, it is heated thereby and because of its bimetallic character, is deflected so that the pin 44 moves upward. As soon as the pin 44 has passed the dead center position, the U-shaped spring 50 acts to move the plate 43 upward with a snap action. This causes the stirrup 45 to engage the contact lever 46 and move it upward until the stirrup contacts with the screw 48. The motion of the lever 45 separates the contacts 47. This motion is accelerated by the spring 51 which has passed the dead center at about the same time that the spring 50 did.

Opening of the contacts 47 interrupts the heating current and the heater 1 no longer supplies heat to the appliance. It also interrupts the current through the member 41 permitting it to cool. This member is not covered by heat insulation. If a casing is used, it is a simple housing which does not interfere to any great extent with the cooling of the member 41. When it is not heated by current through it, the member 41 quickly cools to the ambient temperature. The heater 1 is too far from the member 41 to have any substantial influence on it.

When the member 41 cools sufficiently to cause pin 43 to pass downwardly through its dead center, the spring 50 acts in the opposite direction and the spring 51 also acts in its opposite direction with the result that the contacts 47 close with a snap action. When the contacts 47 have closed, current again flows through the heater 1. If this happens before the contacts 6 have closed, the contacts 47 are opened again quickly, in the same manner as described above, but if the contacts 6 have closed when the contacts 47 close, contacts 47 will remain closed long enough for the bimetallic bar 5 to be heated, the contacts 6 to be separated and the member 41 to be deflected upward. All of these actions except the last take place slowly. But after the contacts 6 open, member 41 is quickly heated and after it passes its dead center, the action is a snap. Thus the intervals of heating and cooling depend upon the wattage supplied by the heater 1 and the temperature required by the appliance in the same way as explained in connection with Fig. 1.

In the form shown in Fig. 4, the mains 2 and 3, the heater 1, the bimetallic bar 5 and the contacts 6 have the relation already explained. A thermostat of the disk type is shown at 60. It includes bridging contact members 61 carried by the disk 60 which control gaps in an annular conductor 62. One terminal block of the conductor 62 is connected by a wire 63 to the wire 2, and the opposite terminal block of conductor 62 is connected by a wire 64 to the heater 1. The two terminals of the thermal contact-controller 5 and 6 are connected to two adjacent blocks of the annular conductor 62 which are permanently bridged by a heater wire 65, preferably annular in shape, which is in close proximity to the bimetallic disk 60, in accordance with a familiar practice. The circuit in this form is from wire 3, through heater 1, wire 64, part of annular conductor 62 and two of its bridges 61 to heater wire 65, through said heater wire, the remaining blocks of the conductor 62 and one bridge 61 and wire 63 to wire 2. At one end of the heater wire 65 the circuit branches, extending through contacts 6 and bimetallic bar 5 and joining the main circuit again at the other end of the resistor wire 65.

In the form shown in Fig. 4, the heating current flows from the main 3 through the heater 1 and the wire 64 to one terminal of the annular conductor 62, through said annular conductor and its bridges 61 to a branch point at one end of the heater wire 65. Here the current divides, one portion traversing the auxiliary heater wire 65 and the other portion traversing the contacts 6 and the bimetallic element 5. The two portions reunite at the opposite end of the heater wire 65 and pass through the remainder of the annular conductor 62 and the remaining bridge 61 to the wire 63 and so to the main wire 2.

The thermostatic disk 60 is in good thermal communication with the atmosphere. If any housing be used, it is one which does not present any substantial obstacle to cooling. Thus the disk 60 returns to the ambient temperature promptly after current stops in the heater wire 65. When the heater 1 is receiving current and contacts 6 are closed, only a small fraction of that current passes through the radiant heater 65 because most of it is shunted through the contacts 6, but when the heater 1 has heated the bimetallic element 5 sufficiently to cause the contacts 6 to open, the whole of the current goes through the resistor 65 which then rapidly heats the disk 60, so that it snaps to circuit-opening position very soon after the contacts 6 open.

When the disk 60 snaps to open-circuit position, the bridging pieces 61 separate from the annular conductor 62 and the circuit through the heater 1 is opened. When the disk 60 has cooled enough to snap in the opposite direction, the bridging pieces 61 complete the circuit through the annular conductor 62 and start the heater 1 into operation again.

When the heating by heater 1 is recommenced, if the contacts 6 are closed, it will continue until the bimetallic bar 5 opens them. Then the disk 60 will be quickly heated by the radiant heater 65 and will promptly open the heating circuit as described above. On the other hand, if the contacts 6 are open at the time the disk 60 snaps to circuit-closing position, the resistor 65 quickly heats the disk and it opens the contacts promptly.

Thus the time of opening and closing of the circuit is dependent upon the heat supplied by the resistor 1 and the temperature required by the appliance in a way already explained.

There will be no sparking when the contacts 6 open because they are bridged by the shunt through the current-heated element, namely, the wire 32 in Fig. 1, the member 41 in Fig. 2 or the wire 65 in Fig. 4. Thus frequent opening and closing such as occurs when the appliance is supplied with current barely sufficient to maintain the desired temperature, will not result in a deterioration of these contacts. The contacts of the main switch, namely, the bridging pieces 10 and 12 in Fig. 1, contacts 47 in Fig. 2 or the bridging pieces 61 in Fig. 4, will not deteriorate because they are opened by a snap action.

Many modifications besides those illustrated and described in detail herein will occur to those skilled in the art and the specific description of the ones herein illustrated is not to be construed as a limitation. The only intentional limitations are those expressed by the claims or required by the prior art.

I claim as my invention:

1. In a control system for a heating appliance, a thermally responsive circuit controller subject to the temperature of the appliance, and a thermal relay sufficiently remote from said appliance to be substantially uninfluenced by the temperature thereof and controlled by said circuit controller, said relay comprising a reversible single metal disk having a contact thereon for opening and closing the circuit of said appliance, a spring member for biasing said disk to one of said circuit-controlling positions, and an expansible and contractible conductor connected to said spring member and in parallel relation to said circuit controller thereby to assist in the mechanical actuation of said contact upon operation of said circuit controller.

2. In a control system for a heating appliance, a thermally responsive circuit controller subject to the temperature of the appliance, and a thermal relay sufficiently remote from said appliance to be substantially uninfluenced by the temperature thereof and controlled by said circuit controller, said relay comprising a contact-maker-and-breaker for opening and closing the circuit of said appliance, a spring for biasing said contact-maker-and-breaker to one of its circuit-controlling positions, a bimetallic member and a snap-action device having a mechanical connection with said contact-maker-and-breaker and said bimetallic member being electrically connected in parallel relation to said circuit controller thereby to cooperate in the mechanical actuation of said contact-maker-and-breaker in opposition to said spring upon operation of said circuit controller.

3. In a control system for a heating appliance, a thermally responsive circuit controller subject to the temperature of the appliance, and a thermal relay sufficiently remote from said appliance to be substantially uninfluenced by the temperature thereof and controlled by said circuit controller, said relay comprising a contact-maker-and-breaker for opening and closing the circuit of said appliance, a spring for biasing said contact-maker-and-breaker to one of its circuit-controlling positions, and a thermostatic member having an operative mechanical connection with said contact-maker-and-breaker and being electrically connected in parallel relation to said circuit controller thereby to cooperate in the mechanical actuation of said contact-maker-and-breaker in conjunction with said spring upon operation of said circuit controller.

EDWARD BLETZ.